United States Patent
Casilli et al.

(10) Patent No.: US 10,296,022 B2
(45) Date of Patent: May 21, 2019

(54) CONFIGURATION OF A BUILDING AUTOMATION SYSTEM CONTROLLER

(71) Applicants: Chris Casilli, Morriston, FL (US); David A. Hingos, East Brunswick, NJ (US); Martin Otto, Princeton, NJ (US); Samuel Negron, Manalapan, NJ (US); Mithun Vaidhyanathan, Sunnyvale, CA (US)

(72) Inventors: Chris Casilli, Morriston, FL (US); David A. Hingos, East Brunswick, NJ (US); Martin Otto, Princeton, NJ (US); Samuel Negron, Manalapan, NJ (US); Mithun Vaidhyanathan, Sunnyvale, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 925 days.

(21) Appl. No.: 13/890,867

(22) Filed: May 9, 2013

(65) Prior Publication Data

US 2013/0268127 A1 Oct. 10, 2013

Related U.S. Application Data

(63) Continuation-in-part of application No. 13/218,132, filed on Aug. 25, 2011.

(60) Provisional application No. 61/694,436, filed on Aug. 29, 2012.

(51) Int. Cl.
G05D 23/19 (2006.01)
H04L 12/28 (2006.01)
H04L 12/24 (2006.01)
G08B 25/14 (2006.01)

(52) U.S. Cl.
CPC .......... *G05D 23/19* (2013.01); *H04L 12/282* (2013.01); *H04L 12/2827* (2013.01); *H04L 41/0806* (2013.01); *G08B 25/14* (2013.01)

(58) Field of Classification Search
CPC .... G05D 23/19; H04L 12/282; H04L 12/2827
USPC ........................................................ 700/276
See application file for complete search history.

(56) References Cited

U.S. PATENT DOCUMENTS

| | | | |
|---|---|---|---|
| 8,918,719 B2* | 12/2014 | Hilbrink et al. | 715/740 |
| 2004/0221738 A1* | 11/2004 | Park | A21B 7/005 |
| | | | 99/348 |
| 2010/0081375 A1 | 4/2010 | Rosenblatt et al. | |
| 2010/0123545 A1 | 5/2010 | Ozawa | |

(Continued)

FOREIGN PATENT DOCUMENTS

| | | |
|---|---|---|
| CN | 101030885 A | 9/2007 |
| CN | 102271313 A | 12/2011 |
| EP | 2424172 A1 | 2/2012 |

OTHER PUBLICATIONS

Blum, Jeremy, "LibeTech QR Code Door Lock", JeremyBlum.com, May 2012 (accessed from <<https://www.jeremyblum.com/portfolio/libetech/>>, on Feb. 11, 2019) (Year: 2012).*

(Continued)

*Primary Examiner* — Kenneth M Lo
*Assistant Examiner* — Michael J Huntley

(57) ABSTRACT

An approach for configuration of a controller in a building automation system (BAS) using a code that may be generated by the BAS, but accessed without a network work connection.

17 Claims, 16 Drawing Sheets

(56) References Cited

U.S. PATENT DOCUMENTS

| | | | |
|---|---|---|---|
| 2010/0168878 A1* | 7/2010 | Hoonhout et al. | 700/90 |
| 2011/0054699 A1* | 3/2011 | Imes et al. | 700/276 |
| 2011/0208710 A1* | 8/2011 | Lesavich | 707/706 |
| 2012/0210268 A1 | 8/2012 | Hilbrink et al. | |
| 2013/0245838 A1* | 9/2013 | Zywicki et al. | 700/278 |
| 2013/0263034 A1* | 10/2013 | Bruck et al. | 715/771 |
| 2014/0061293 A1* | 3/2014 | Jayaprakash et al. | 235/375 |
| 2014/0188287 A1* | 7/2014 | Sabata | 700/276 |
| 2014/0317029 A1* | 10/2014 | Matsuoka et al. | 706/12 |
| 2015/0017293 A1* | 1/2015 | Carr | A47J 31/3623 426/232 |

OTHER PUBLICATIONS

PCT Search Report dated Jan. 7, 2014, for PCT Application No. PCT/US2013/057299. (9 pages).
Chinese Office Action dated Sep. 30, 2018, for CN Application No. 201380056392.7, 9 pages.

\* cited by examiner

CONFIGURATION OF A BUILDING AUTOMATION SYSTEM CONTROLLER

RELATED APPLICATIONS

This application is a continuation-in-part of U.S. patent application Ser. No. 13/218,132, titled SYNERGISTIC INTERFACE SYSTEM FOR A BUILDING NETWORK, filed on Aug. 25, 2011, and U.S. Provisional Patent application 61/694,436, titled METHODS OF USING QR CODES FOR AUTHENTICATION TO AN INFORMATION SYSTEM VIA A MOBILE DEVICE, filed on Aug. 29, 2012, both of which are incorporated herein by reference in their entireties.

FIELD OF THE INVENTION

This application relates to the field of building systems and, more particularly, to interfaces for modification of parameters used in a building automation system.

BACKGROUND

Building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning ("HVAC") systems. Lighting systems and HVAC systems are sometimes referred to as "environmental control systems" because these systems control the environmental conditions within the building. A single facility may include multiple building automation systems (e.g., a security system, a fire system and an environmental control system). Multiple building automation systems may be arranged separately from one another or as a single system with a plurality of subsystems that are controlled by a common control station or server. The common control station or server may be contained within the building or remote from the building, depending upon the implementation.

The elements of a building automation system may be widely dispersed throughout a facility or campus. For example, an HVAC system includes temperature sensors and ventilation damper controls as well as other elements that are located in virtually every area of a facility or campus. Similarly, a security system may have intrusion detection, motion sensors and alarm actuators dispersed throughout an entire building or campus. Likewise, fire safety systems include smoke alarms and pull stations dispersed throughout the facility or campus. The different areas of a building automation system may have different environmental settings based upon the use and personal likes of people in those areas, such as offices and conference rooms.

Building automation systems typically have one or more centralized control stations in which data from the system may be monitored, and in which various aspects of system operation may be controlled and/or monitored. The control station typically includes a computer or server having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the Apogee® Insight® Workstation, available from Siemens Industry, Inc., Building Technologies Division, of Buffalo Grove, Ill. ("Siemens"), which may be used with the Apogee® building automation system, also available from Siemens. In this system, several control stations connected via an Ethernet or another type of network may be distributed throughout one or more building locations, each having the ability to monitor and control system operation.

The typical building automation system (including those utilizing the Apogee® Insight® Workstation) has a plurality of field panels that are in communication with the central control station. While the central control station is generally used to make modifications and/or changes to one or more of the various components of the building automation system, a field panel may also be operative to allow certain modifications and/or changes to one or more parameters of the system. This typically includes changes to parameters such as temperature and lighting, and/or similar parameters.

The central control station and field panels are in communication with various field devices, otherwise known as "points". Field devices are typically in communication with field panels of building automation systems and are operative to measure, monitor, and/or control various building automation system parameters. Example field devices include lights, thermostats, damper actuators, alarms, HVAC devices, sprinkler systems, speakers, door locks, and numerous other field devices as will be recognized by those of skill in the art. These field devices receive control signals from the central control station and/or field panels. Accordingly, building automation systems are able to control various aspects of building operation by controlling the field devices.

Large commercial and industrial facilities have numerous field devices that are used for environmental control purposes. These field devices may be referred to herein as "environmental control devices".

As the environmental settings of the environmental control devices have traditionally been set using thermostats and switches, limited security was available to secure the devices. Known approaches have included covers with locks to prevent modification of a thermostat or lights. More recently, wired and wireless network approaches have been employed, where networked or smart switches and thermostats have been accessed and controlled by people to adjust the environment they are currently in, such as an office or conference room, via a computer or wireless device that communicates with the building data networks. It is also desirable for users to have more control over their environment, but initial configuration for personalized environmental controls is often complicated and time consuming because of the complexity of non-residential building automation systems.

While existing building automation systems may allow for network users to modify their environment using a data network, this creates issues for network security and determining authorized users. Furthermore, known approaches require labor intensive complicated programming if controls are going to be truly customized per user. What is needed in the art is an approach that will address these issues and problems identified above.

SUMMARY

In accordance with one embodiment of the disclosure, there is provided a network independent interface approach for building automation systems. Users set their desired environmental settings using an application executed by a processor in a mobile computing device or a dedicated device. The application in the mobile computing device may be initially configured with configuration and authentication data via reading a code that has been previously encoded with that data. Once configured, the mobile computing device or dedicated device is then associated with the system and may be used.

Once the desired settings are set in the application via a user, a machine readable code is generated and displayed on the mobile computing device. That code is then presented to a reader that is connected to the building automation system. The reader reads the code and the building automation system decodes the data contained in the code and adjusts the environmental controls accordingly for a location located by the reader or encoded in the code.

The above described features and advantages, as well as others, will become more readily apparent to those of ordinary skill in the art by reference to the following detailed description and accompanying drawings. While it would be desirable to provide an interface system for a building network that provides one or more of these or other advantageous features, the teachings disclosed herein extend to those embodiments which fall within the scope of the appended claims, regardless of whether they accomplish one or more of the above-mentioned advantages.

DESCRIPTION

An example approach for modification of environmental settings is presented. In the example, a user may modify the environmental settings of a building automation system via generation of a machine readable code that is read by a reader device located in an environmental control access panel. Prior to the generation of the machine readable code, the device or application that generates the machine readable code is configured or populated with configuration and authentication data.

Figure 1:
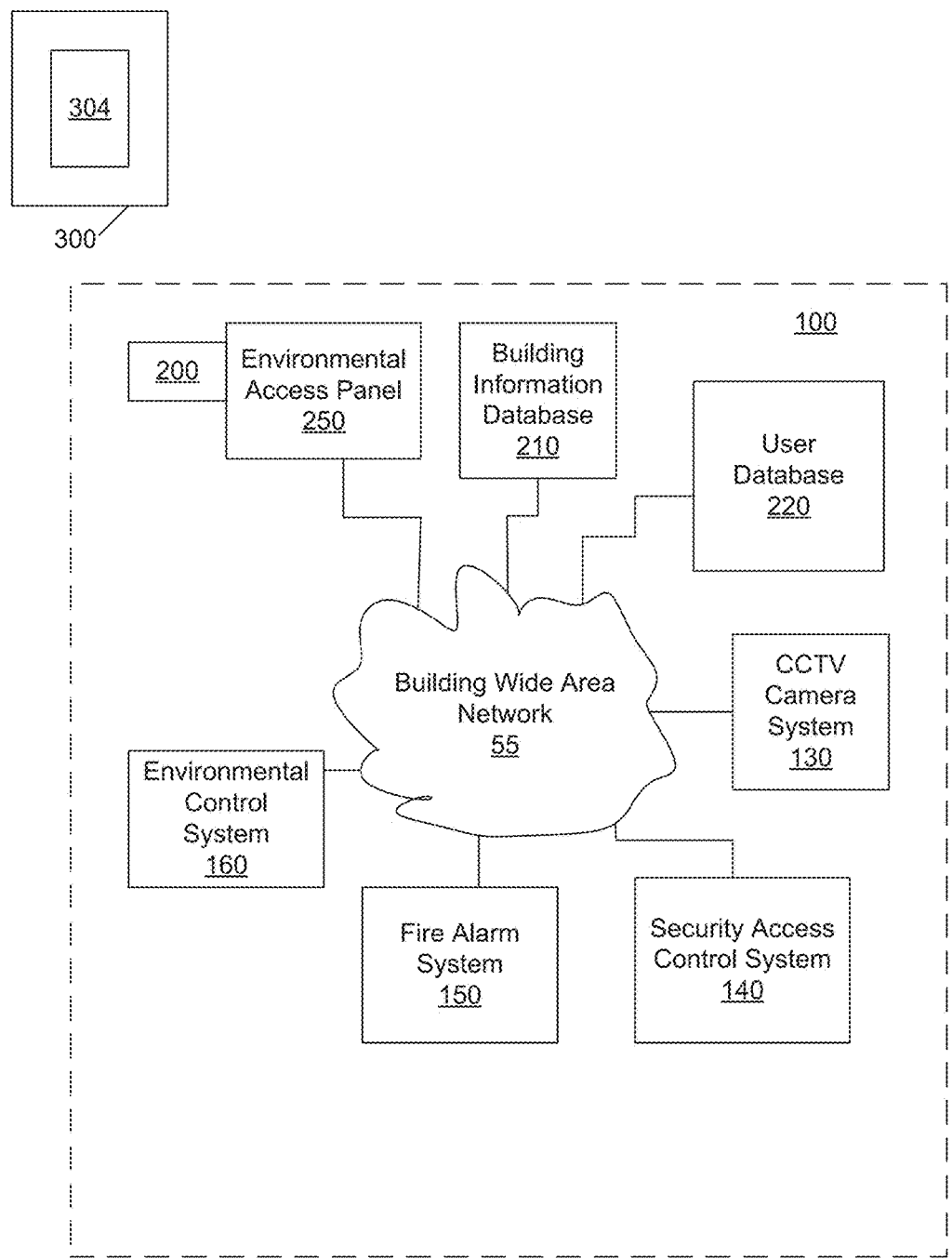
FIG. 1 shows an exemplary topology diagram for a building automation system having an environmental control access panel.

With reference to FIG. 1, an exemplary topology diagram for a building automation system approach is shown. The building wide area network 55 includes a plurality of systems and components in wired or wireless communication. The building wide area network 55 generally includes a plurality of building automation systems 100 and may be accessed via a "building synergistic interface system" or "BSIS". The BSIS 200 may be changed by one or more mobile computing devices 300 that are able to generate a graphical display readable by the BSIS 200 that may be part of an environmental control access panel 250. The BSIS 200 further may include access to a data storage device comprising a building information database 210 and a user database 220. Software for communicating environmental and other data to the BSIS 200 may be stored on both the mobile computing device 300 and/or the building automation system 100. As will be explained herein, the BSIS 200 enables one or more of the environmental settings in a building automation system to be adjusted based on human actions without a network connection between the mobile computing device 300 and the BSIS 200.

In the following pages, the general arrangement of an exemplary building automation system 100 configured for use with the BSIS 200 is explained first. Thereafter, the general arrangement of the environmental control access panel 250 is explained followed by the general arrangement of the mobile computing device 300. Overall operation of the BSIS 200 is discussed following the description of the building automation system (BAS), environmental access control panel 250, and the mobile computing device 300.

Building Automation System

Figure 2:
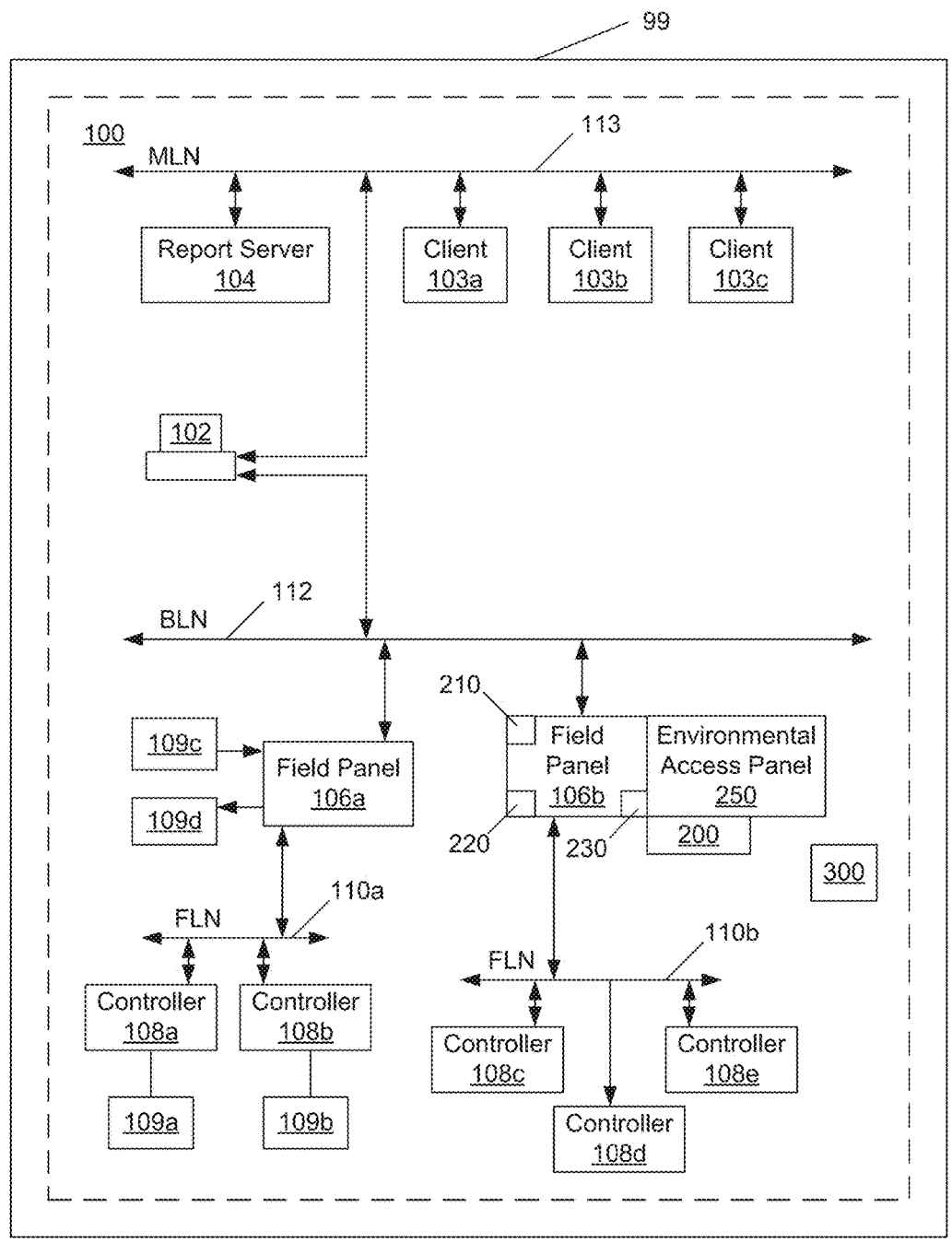
FIG. 2 shows an exemplary block diagram of a building automation system of the building network of FIG. 1.

In the example embodiment of FIG. 1, the building automation system 100 includes a building information database 210, user database 220, closed circuit television system 130, a security system 140, a fire alarm system 150, and an environmental control system 160. In FIG. 2, a system block diagram of an exemplary building automation system (BAS) 100 within a building 99 is depicted. The building automation system 100 is depicted as a distributed building system that provides control functions for any one of a plurality of building operations, such as environmental control, security, life or fire safety, industrial control and/or the like. An example of a BAS is the Apogee® building automation system available from Siemens Industry, Inc., Building Technologies Division, of Buffalo Grove, Ill. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

With particular reference to FIG. 2, the building automation system 100 includes at least one supervisory control system or workstation 102, client workstations 103a-103c, report server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystem, each controller 108a-108e connects to one or more field devices, such as sensors or actuators, shown by way of example in FIG. 2 as the sensor 109a is connected to the controller 108a and the actuator 109b is connected to controller 108b.

Typically, a controller such as the controller 108a affects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers 108a-108e, the field panels 106a and 106b, the work station 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via building level network ("BLN") 112 to the workstation 102 and the report server 104. The field panels 106a and 106b thereby coordinate the communication of data and control signals between the subsystems 108a-108e and the supervisory computer 102 and report server 104. In addition, one or more of the field panels 106a, 106b may themselves be in direct communication with and control field devices, such as ventilation damper controllers or the like. To this end, as shown in FIG. 2, the field panel 106a is operably connected to one or more field devices, shown for example as a sensor 109c and an actuator 109d.

The workstation (server in other implementations) 102 provides overall control and monitoring of the building automation system 100 and includes a user interface. The workstation 102 further operates as a BAS data server that exchanges data with various elements of the BAS 100. The BAS data server can also exchange data with the report server 104. The BAS data server 102 allows access to the BAS system data by various applications. Such applications may be executed on the workstation 102 or other supervisory computers (not shown).

With continued reference to FIG. 2, the workstation 102 is operative to accept modifications, changes, alterations and/or the like from the user. This is typically accomplished via a user interface of the workstation 102. The user interface may include a keyboard, touchscreen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like from the user.

The workstation 102 also preferably maintains a database associated with each field panel 106a and 106b. The database maintains operational and configuration data for the associated field panel. The report server 104 stores historical data, trending data, error data, system configuration data, graphical data and other BAS system information as appropriate. In at least one embodiment, the building information database 210 and the user database 220 may be accessed by the BSIS 200 via the BAS data server 102. In other embodiments the building information database 210 and the user database 220 may be stored elsewhere, such as field panel 106b.

The management level network (MLN) 113 may connect to other supervisory computers and/or servers, internet gateways, or other network gateways to other external devices, as well as to additional network managers (which in turn connect to more subsystems via additional low level data networks). The workstation 102 may operate as a supervisory computer that uses the MLN 113 to communicate BAS data to and from other elements on the MLN 113. The MLN 113 may suitably comprise an Ethernet or similar wired network and may employ TCP/IP, BACnet, and/or other protocols that support high speed data communications.

FIG. 2 also shows that the BAS 100 may include a field panel 106b that is shown in FIG. 2 as a housing that holds the building information database 210, the user database 220, and the environmental access panel 250 having BSIS 200. The mobile computing device 300 is configured for wireless communications with the BAS 100 via the environmental access panel 250 provided on the field panel 106b. While the foregoing BSIS members are shown in FIG.

2 as being associated with one of the field panels 106b, it will be recognized that in other embodiments these and other BSIS members may be differently positioned in or connected to the BAS 100. For example, the building information database 210 and the user database 220 of the BSIS could be provided on the workstation 102. Alternatively, the building information database 210 and the user database 220 could be housed separately from those components shown in FIG. 2, such as in a separate computer device that is coupled to the building level network 112 or other BAS location. Such a separate computer device could also be used to store BSIS operational software. Similarly, the environmental access panel 250 with BSIS 200 may be housed within the workstation 102 or within a separate computer device coupled to the building level network 112 of the BAS.

Figure 3:
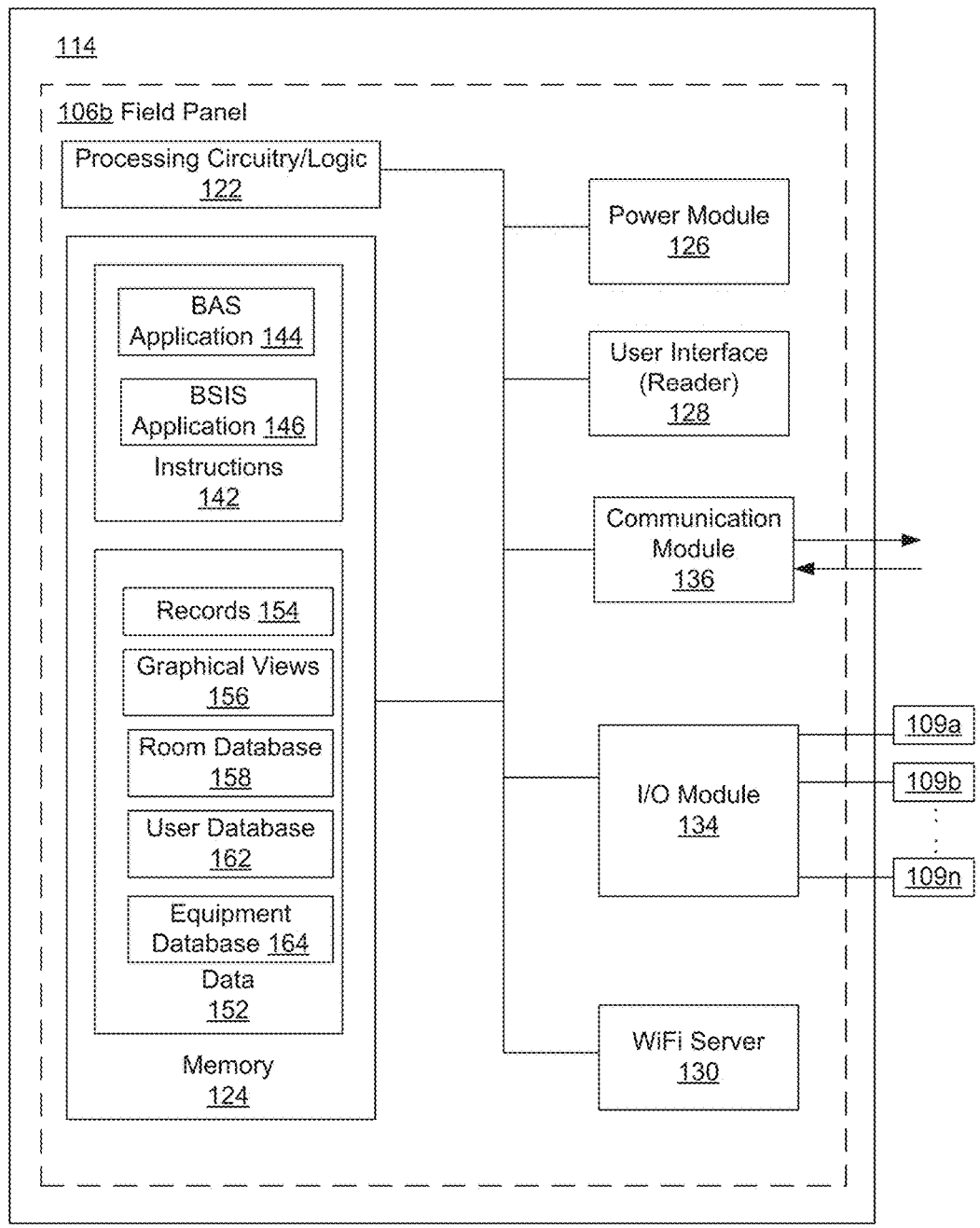
FIG. 3 shows an exemplary internal block diagram of a field panel for the building automation system of FIG. 2.

With reference now to FIG. 3, a block diagram of an exemplary embodiment of the field panel 106b of FIG. 2 is shown. It should be appreciated that the embodiment of the field panel 106b is only an exemplary embodiment of a field panel in a BAS 100 coupled to the BSIS 200. As such, the exemplary embodiment of the field panel 106b of FIG. 3 is a generic representation of all manners or configurations of field panels that are operative in the manner set forth herein.

The field panel 106b of FIG. 3 includes a housing, cabinet or the like 114 that is configured in a typical manner for a building automation system field panel. The field panel 106b includes processing circuitry/logic 122, memory 124, a power module 126, a user interface 128, an I/O module 134, a BAS network communications module 136, and the WiFi server 130.

The processing circuitry/logic 122 is operative, configured and/or adapted to operate the field panel 106b including the features, functionality, characteristics and/or the like as described herein. To this end, the processing circuitry logic 122 is operably connected to all of the elements of the field panel 106a described below. The processing circuitry/logic 122 is typically under the control of program instructions or programming software or firmware contained in the instructions 142 area of memory 124, explained in further detail below. In addition to storing the instructions 142, the memory also stores data 152 for use by the BAS 100 and/or the BSIS 200.

The field panel 106b also includes a power module 126 that is operative, adapted and/or configured to supply appropriate electricity to the field panel 106b (i.e., the various components of the field panel). The power module 126 may operate on standard 120 volt AC electricity, but may alternatively operate on other AC voltages or include DC power supplied by a battery or batteries.

An input/output (I/O) module 134 is also provided in the field panel 106b. The I/O module 134 includes one or more input/output circuits that communicate directly with terminal control system devices such as actuators and sensors. Thus, for example, the I/O module 134 includes analog input circuitry for receiving analog sensor signals from the sensor 109a, and includes analog output circuitry for providing analog actuator signals to the actuator 109b. The I/O module 134 typically includes several of such input and output circuits.

The field panel 106b further includes a BAS network communication module 136. The network communication module 136 allows for communication to the controllers 108c and 108e as well as other components on the FLN 110b, and furthermore allows for communication with the workstation 102, other field panels (e.g., field panel 106a) and other components on the BLN 112. To this end, the BAS network communication module 136 includes a first port (which may suitably be a RS-485 standard port circuit) that is connected to the FLN 110b, and a second port (which may also be an RS-485 standard port circuit) that is connected to the BLN 112.

The field panel 106b may be accessed locally. To facilitate local access, the field panel 106b includes an interactive user interface 128. Using user interface 128, the user may control the collection of data from devices such as sensor 109a and actuator 109b. The user interface 128 of the field panel 106b includes devices that display data and receive input data. Reception of input data may include a code reader device, such as a Quick Response (QR) code reader. These devices may be devices that are permanently affixed to the field panel 106b or portable and moveable. The user interface 128 may also suitably include an LCD type screen or the like, and a keypad. The user interface 128 is operative, configured and/or adapted to both alter and show information regarding the field panel 106b, such as status information, and/or other data pertaining to the operation, function and/or modifications or changes to the field panel 106b.

As mentioned above, the memory 124 includes various programs that may be executed by the processing circuitry/logic 122. In particular, the memory 124 of FIG. 3 includes a BAS application 144 and a BSIS building application 146. The BAS application 144 includes conventional applications configured to control the field panel 106b of the BAS 100 in order to control and monitor various field devices 109a-n of the BAS 100. Accordingly, execution of the BAS application 144 by the processing circuitry/logic 122 results in control signals being sent to the field devices 109a-n via the I/O module 134 of the field panel 106b. Execution of the BAS application 144 also results in the processor 122 receiving status signals and other data signals from various field devices 109a-n, and storage of associated data in the memory 124. In one embodiment, the BAS application 144 may be provided by the Apogee® Insight® BAS control software commercially available from Siemens Industry, Inc. or another BAS control software.

In addition to the instructions 142, the memory 124 may also include data 152. The data 152 includes records 154, graphical views 156, a room database 158, a user database 162, and an equipment database 164. The records 154 include current and historical data stored by the field panel 106b in association with control and operation of the field devices 109a-n. For example, the records 154 may include current and historical temperature information in a particular room of the building 99, as provided by a thermistor or other temperature sensor within the room. The records 154 in the memory may also include various set points and control data for the field devices 109, which may be pre-installed in memory 124 or provided by the user through the user interface 128. The records 154 may also include other information related to the control and operation of the 100 BAS and BSIS building application 146, including statistical, logging, licensing, and historical information.

The graphical views 156 provide various screen arrangements to be displayed to the user via the user interface 128. Examples of such screens for display on the mobile computing device 300 are provided in FIGS. 8, 9 and 11, discussed in further detail below. The user interface 128 may be displayed at thermostats with displays or other user access points having displays, such as liquid crystal displays, light emitting diode displays, or other known types of visual displays devices.

The room database 158 may include data related to the layout of the building 99. This room database 158 includes a unique identifier for each room or area within the building (e.g., room "12345"). In addition to the unique identifier data, the room database 158 may include other information about particular rooms or areas within the building 99. For example, the room database 158 may include information about field devices located within the room or area, particular equipment (e.g., research equipment, manufacturing equipment, or HVAC equipment) positioned within the room or area.

The user database 162 may include data related to human users who frequent the building 99. Accordingly, the user database 162 may include a unique identifier for each human user (e.g., user "12345") and a user profile associated with that user. In other implementations, each room or area may have a profile that has one or more users associated with it. The user profile may include information provided by the user or provided by third parties about the user. For example, the user profile may include a preferred temperature or lighting level for the user, which is provided to the user database 162 by the user. Also, the user profile may include a security clearance level, room access, or data access for the user, all provided to the database 162 by a third party, such as the human resources department or security department for the employer who owns the building 99.

The equipment database 164 may include data related to various pieces of equipment within the building 99. The equipment may include field devices associated with the BAS 100 or other equipment that is positioned within the building 99. For example, the equipment database 164 may include information related to manufacturing or research equipment located in a particular room of the building. The equipment database 164 maintains a unique identifier for each piece of equipment (e.g., equipment "12345") and data associated with that equipment. For example, the database 164 may associate particular schematics, operation manuals, photographs, or similar data with a given piece of equipment within the database 164.

While the field panel 106*b* has been explained in the foregoing embodiment as housing the BSIS building application 146 and various BSIS databases, such as the room database 158, user database 162, and equipment database 164, it will be recognized that these components may be retained in other locations in association with the BAS 100. For example, these components could all be retained within the central workstation 102 of the BAS 100 or a separately designated BSIS computing device in the BAS 100.

Figure 4:
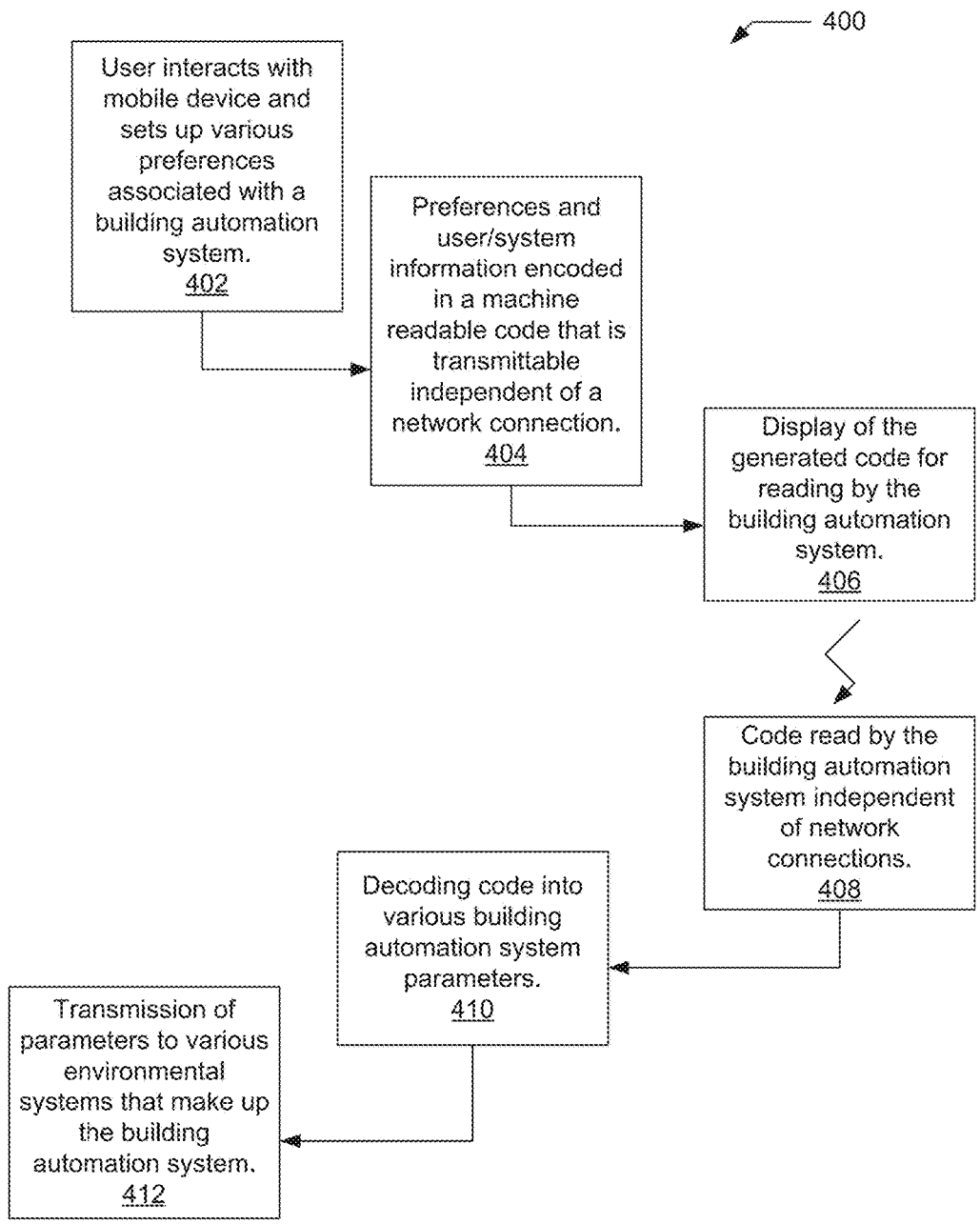
FIG. 4 shows an exemplary process flow diagram of modification of a building automation system using parameters encoded by a mobile device and read by the building automation system independent of the network.

Turning to FIG. 4, an exemplary process flow diagram 400 of modification of a building automation system using parameters encoded by a mobile device and read by the building automation system independent of the network is depicted. A user interacts with a mobile device, such as mobile device 300, and sets up various environmental parameters associated with the building automation system via a mobile application 404. The mobile application then uses the various preferences and user information contained in the mobile device to encode the data into machine-readable code that is transmittable independent of the network 404. The data that is encoded may also include information associated with the building automation system, such as fan identifies or blind identifies. The term "transmittable independent of a network" means that the data is transferred without having to physically insert a memory device into the system to be read. Examples of independent transmission include a reader that reads codes, such as bar codes or QR codes, RFID tags, MOS codes, flashing lights, and magnetic card readers. The various preferences and other data may then be generated into a machine-readable (machine-perceivable) code that is displayed on the mobile device 406. The displayed code may be read off the mobile device or a printed code by the building automation system independent of network connections 408. The building automation system decodes the various parameters from the code via a processor 410. The various parameters are then sent to the systems, such as environment systems that make up the building automation system 412 in the current example.

Environment Access Control Panel

Figure 5:
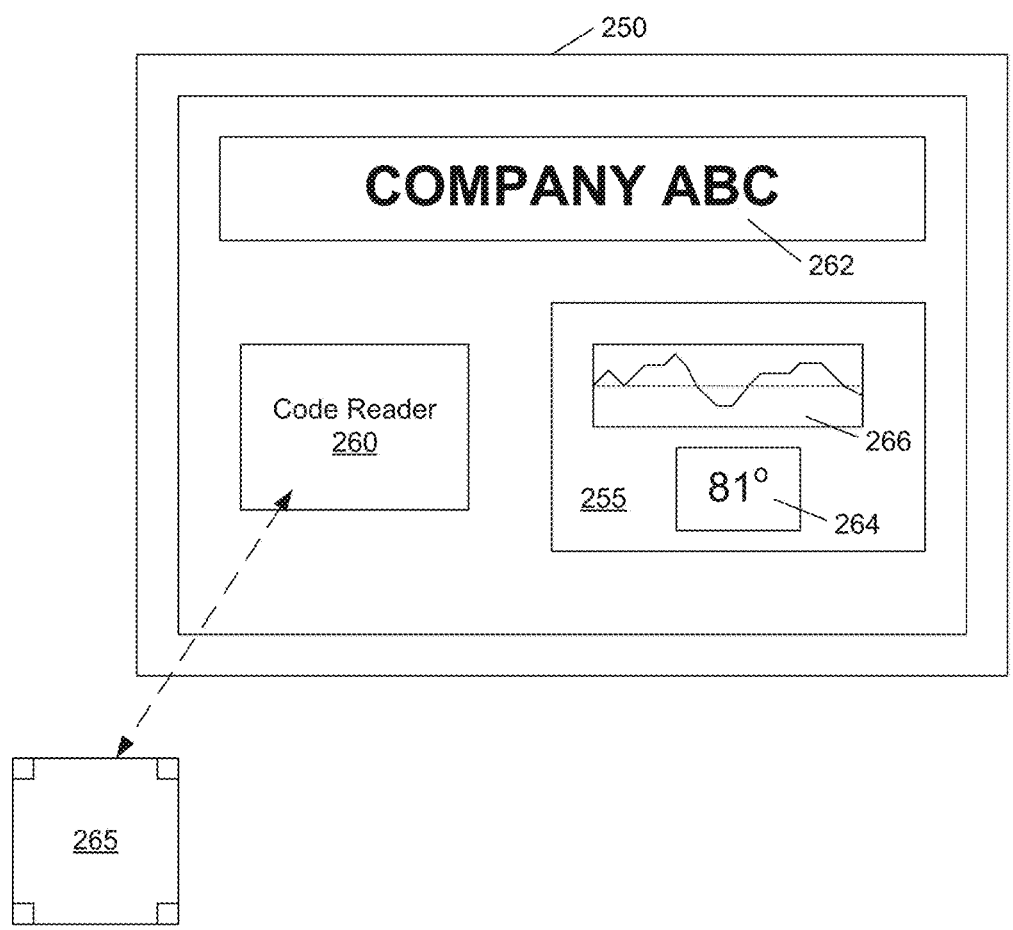
FIG. 5 shows an exemplary front view of an environmental control access panel with display for the building interface system of FIG. 1.

With reference now to FIG. 5, an exemplary environmental access control panel device 250 is shown. The system environmental access control panel device 250 may be one of a number of different environmental access control panel devices that are mounted in various locations in the building 99. The environmental access control panel device 250 may be configured to present information to a human user, and in some embodiments, may be configured to receive information from the human user. Accordingly, the environmental access control panel device 250 includes a display screen 255, such as a LED, LCD or plasma screen capable of displaying visual data to a human user.

The primary function of the environmental access control panel device 250 is to have a reader that is able to read encoded symbols or characters (user preferences in a coded QR format). In the current example, the reader may be a QR code reader 260. The environmental access control panel device 250 may also have one or more displays for providing information to users. Examples of such information include location 262, temperature 264, and/or energy consumption 266. In the example of FIG. 4, a QR code 265 pattern that is indicative of environmental settings is presented to the reader 260. The reader may read the QR code 265 from paper, wireless device, or other materials that support the reading of the QR code 265. It is understood that the reader for QR codes in the current example, may be a reader for bar codes, text codes, or other machine readable codes in other implementations. It is noted that the reading of the encoded environmental data occurs without a user having to have access to the data network or the building automation network.

The environmental access control panel device 250 with BSIS 200 capable of reading the QR code 265 may be mounted to the building 99 at a location that is within or in close proximity to a room or group of rooms for convenience of the users. In other implementations, a central location may be provided for the environmental access control panel device 250, such as mounted on a wall in the main lobby of the building 99, next to the doorway or other threshold of a testing lab in the building 99. It is understood that the environmental access control panel device 250 is not required to be associated with any specific area of the building 99. The association of the area within building 99 to a QR code is encoded within the QR code 265.

The environmental access control panel device 250 may be coupled to the BLN 112 or a FLN 110*b* of the BAS 100. Accordingly, the environmental access control device 250 may be configured to transmit and receive information from the BAS 100. Received information from the BAS 100 may be displayed on the display screen 255. This information may include the building information indicia 262, 264, and 266 as well as other information that may be beneficial to a human user, such as building information, weather information, current news, time of day, or other information. As noted above, the display screen 255 of the environmental access control panel device 250 of FIG. 5 is a dynamic display that is capable of changing over time.

In addition to a display screen 255, the system enrollment/display device may include additional components that allow the human to interface with the BAS 100. For example, in at least one embodiment, the display screen 255 is a touch screen that allows a user to input data via the display screen 255. The environmental access control panel device 250 may also include additional components, such as speakers, microphones, cameras, various data communications ports, and other interface components, including those that are commonly found on televisions and computer monitors. These additional interface components may be used to provide the human user with helpful features, such as providing audio instructions for the BSIS 200 to a human user. These additional interface components may also be used by security to provide surveillance cameras and intercoms at various locations within the building. Additionally, the interface components may be used by maintenance when operational issues arise with the environmental access control panel device 250.

While the environmental access control panel device 250 has been explained above as displaying dynamic data and having multiple electronic features, in other embodiments the environmental access control panel device 250 may be configured to display only static data and be free of electronic components. In such an arrangement, the environmental access control panel device 250 may be a printed sign posted outside of a room or a doorway that identifies the room and displays the building information. When a plurality of environmental access control panel devices are present in a building 99, a combination of static and dynamic devices may be used, including printed signs (with readers) as described in this paragraph in combination with devices with screens and various electronic components, as described above in association with FIG. 5.

Mobile Computing Device

Figure 6:
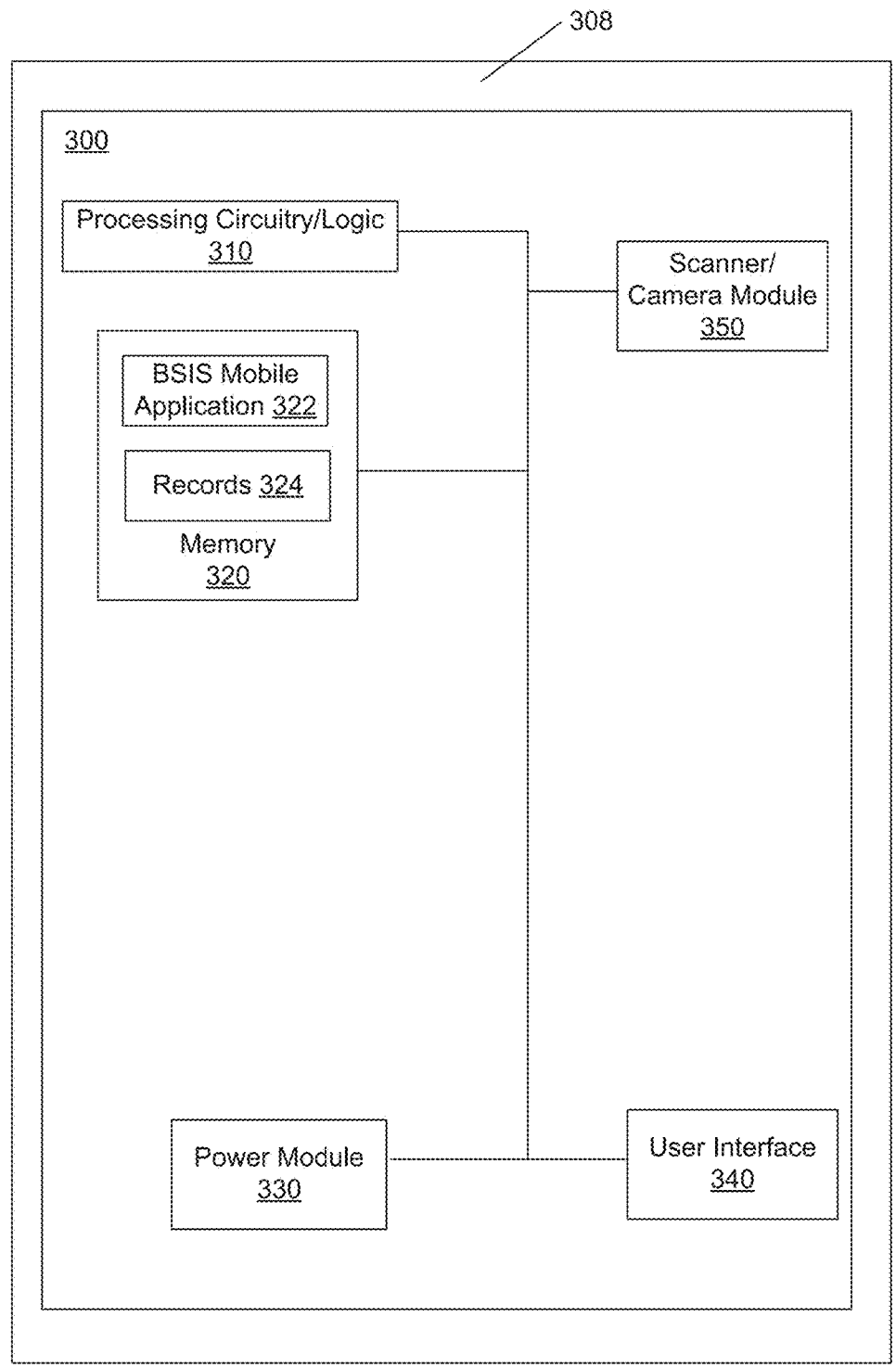
FIG. 6 shows an exemplary internal block diagram of a mobile computing device for the building interface system of FIG. 1.

In addition to the system environmental access control panel device 250, the BSIS may also include a mobile computing device 300, FIG. 1. The mobile computing device 300 may be provided by any mobile device capable of being carried by a human, and generating a code (QR code 260 in the current example). With reference now to FIG. 6, an internal block diagram of an exemplary mobile computing device 300 is shown. The mobile computing device 300 includes a scanner/camera module 350 that may be configured to read the building information QR codes 260 and a user interface 340 that includes a display screen. Exemplary mobile computing devices include personal digital assistants, smart phones, and handheld personal computers (e.g., DROID®, IOS®, IPHONE®, IPOD®, IPOD TOUCH®, IPAD®, etc.).

The mobile computing device 300 of FIG. 6 includes a housing, case or the like 308 that is configured in a typical manner for a mobile computing device. The mobile computing device 300 includes processing circuitry/logic 310, a memory 320, a power module 330, a user interface 340, and a camera/scanner module 350, all positioned within the housing 308. It will be appreciated by one having ordinary skill in the art that the embodiment of the mobile computing device 300 is only an exemplary embodiment of a mobile computing device configured for communication with the BAS 100 over a wireless network and may include other components not shown to avoid obscuring aspects of the present invention.

The processing circuitry/logic 310 is operative, configured and/or adapted to operate the mobile computing device 300 including the features, functionality, characteristics and/or the like as described herein. To this end, the processing circuitry/logic 310 is coupled to all of the elements of the mobile computing device 300 described below. The processing circuitry/logic 310 is typically under the control of program instructions or programming software or firmware 322 contained in memory 320, explained in further detail below. In addition to storing the instructions 322, the memory also stores data 324 for use by the BAS 100 and/or the BSIS 200.

The mobile computing device 300 also includes a power module 330 that is operative, adapted and/or configured to supply appropriate electricity to the mobile computing device 300 (i.e., the various components of the mobile computing device). The power module 330 is generally DC power supplied by a battery or batteries.

The mobile computing device 300 further includes a user interface 340. The user interface 340 allows the mobile computing device 300 to present information to the user, and also allows the user to insert data into the mobile computing device 300. Accordingly, the user interface 340 may be configured to drive a touchscreen, keypad, buttons, speaker, microphone, or any of various other standard user interface devices.

A camera/scanner module 350 may also be provided in the mobile computing device 300. The camera/scanner module 350 may be configured by software or an application to read the QR codes 265 that have previously been generated and associated with the BAS 100. Thus, for example, the camera/scanner module 350 may include a camera configured to focus on a QR CODE, such as QR code 265 and produce an electronic data file of the image (e.g., a JPEG file).

The electronic data file generated by the camera/scanner module 350 may be stored in memory 320. The processing circuitry/logic 310 is configured to process the electronic data file generated by the camera/scanner module 350 into indicia data that is used by one or more applications. For example, the processing circuitry/logic 310 may be configured to generate a QR code number or other unique identifier associated with the building information indicia captured by the mobile computing device 300 and user entered data.

The memory 320 includes various programs that may be executed by the processing circuitry/logic 310 (which may include a processor). In particular, the memory 320 in the mobile communications device 300 of FIG. 6 includes a BSIS mobile application 322. The BSIS mobile application 322 is configured to facilitate advanced interactions between a human user in possession of the mobile communications device and the building automation system 100. To this end, the BSIS mobile application 322 is configured to generate a machine readable code (QR code in the current example) with at least environmental settings for use by the BSIS 200. An example of pseudo code that may be used to generate a QR code is presented:

```
/*
Point XX XXXXXXXX XXXXXXXX XX XX ~
        ^  ^           ^            ^  ^
        |  |           |            |  |
        |  |           |            |  |
   Object |           |            |  |
   Type#  |           |            |  |
        |              |            |  |
    Instance           |            |  |
    Number             |            |  |
                       |            |  |
                       |            |  |
              IP Address            |  |
                                    |  |
                                Mac |
                                    |
                              Network
(1)      0200000032C28AD827XXXXXXXXXXX~    [Temperature Monitor]
(2)      0200000032C28AD827XXXXXXXXXXX~    [Temperature SetPoint]
(3)      0200000032C28AD827XXXXXXXXXXX~    [Humidity Monitor]
(4)      0200000032C28AD827XXXXXXXXXXX~    [Humidity Setpoint]
(5)      0200000032C28AD827XXXXXXXXXXX~    [AirQuality Monitor]
(6)      0200000032C28AD827XXXXXXXXXXX~    [AirQuality Setpoint]
(7)      0200000032C28AD827XXXXXXXXXXX~    [Fan Monitor]
(8)      0200000032C28AD827XXXXXXXXXXX~    [Fan Setpoint]
(9)      0200000032C28AD827XXXXXXXXXXX~    [Light Monitor]
(10)     0200000032C28AD827XXXXXXXXXXX~    [Light Setpoint]
(11)     0200000032C28AD827XXXXXXXXXXX~    [Blind Monitor]
(12)     0200000032C28AD827XXXXXXXXXXX~    [Blind SetPoint]
(13)     0200000032C28AD827XXXXXXXXXXX~    [OccMode Point]
(14)     0200000032C28AD827XXXXXXXXXXX~    [Green Leaf Point]
(15)     0200000032C28AD827XXXXXXXXXXX~    [Emergency Point]
(1)      00750          [Preset #1 Temperature]
(2)      XXXXX          [Preset #1 Humidity]
(3)      XXXXX          [Preset #1 AirQuality]
(4)      XXXXX          [Preset #1 Fan]
(5)      XXXXX          [Preset #1 Light]
(6)      XXXXX          [Preset #1 Blind]
(7)      XXXXX~         [Preset #1 OccMode]
*/
NSMutableString * tempMString = [NSMutableString stringWithCapacity:0];
[tempMString appendString:@"0200000051C28AD827XXXXXXXXXXXXXX~"]; // Temperature
[tempMString appendString:@"0200000056C28AD827XXXXXXXXXXXXXX~"]; // Temperature STPT
[tempMString appendString:@"0200000057C28AD827XXXXXXXXXXXXXX~"]; // Humidity
[tempMString appendString:@"0200000058C28AD827XXXXXXXXXXXXXX~"]; // HumiditySTPT
[tempMString appendString:@"0200000061C28AD827XXXXXXXXXXXXXX~"]; // AirQuality
[tempMString appendString:@"0200000062C28AD827XXXXXXXXXXXXXX~"]; // AirQualitySTPT
[tempMString appendString:@"020000005DC28AD827XXXXXXXXXXXXXX~"]; // Fan
[tempMString appendString:@"020000005EC28AD827XXXXXXXXXXXXXX~"]; // FanSTPT
[tempMString appendString:@"0200000059C28AD827XXXXXXXXXXXXXX~"]; // Light
[tempMString appendString:@"020000005AC28AD827XXXXXXXXXXXXXX~"]; // LightSTPT
[tempMString appendString:@"020000005BC28AD827XXXXXXXXXXXXXX~"]; // Blind
[tempMString appendString:@"020000005CC28AD827XXXXXXXXXXXXXX~"]; // BlindSTPT
[tempMString appendString:@"050000001DC28AD827XXXXXXXXXXXXXX~"]; // OccMode
[tempMString appendString:@"0200000060C28AD827XXXXXXXXXXXXXX~"]; // GreenLeaf
[tempMString appendString:@"050000001EC28AD827XXXXXXXXXXXXXX~"]; // Emergency
[tempMString appendString:@"00700"]; // Preset1Temperature
[tempMString appendString:@"00500"]; // Preset1Humidity
[tempMString appendString:@"20000"]; // Preset1AirQuality
[tempMString appendString:@"00000"]; // Preset1Fan
[tempMString appendString:@"00000"]; // Preset1Light
[tempMString appendString:@"00000"]; // Preset1Blind
[tempMString appendString:@"00000"]; // Preset1OccMode
[tempMString appendString:@"~"]; // Preset1ClosingMark
[tempMString appendString:@"00745"]; // Preset2Temperature
[tempMString appendString:@"00450"]; // Preset2Humidity
[tempMString appendString:@"08000"]; // Preset2AirQuality
[tempMString appendString:@"00600"]; // Preset2Fan
[tempMString appendString:@"00300"]; // Preset2Light
[tempMString appendString:@"08000"]; // Preset2Blind
[tempMString appendString:@"00010"]; // Preset2OccMode
[tempMString appendString:@"~"]; // Preset2ClosingMark
[tempMString appendString:@"00780"]; // Preset3Temperature
[tempMString appendString:@"00600"]; // Preset3Humidity
[tempMString appendString:@"10000"]; // Preset3AirQuality
[tempMString appendString:@"00400"]; // Preset3Fan
[tempMString appendString:@"00500"]; // Preset3Light
```

```
[tempMString appendString:@"01000"]; // Preset3Blind
[tempMString appendString:@"00010"]; // Preset3OccMode
[tempMString appendString:@"~"]; // Preset3ClosingMark
[tempMString appendString:@"00720"]; // Preset4Temperature
[tempMString appendString:@"00300"]; // Preset4Humidity
[tempMString appendString:@"08000"]; // Preset4AirQuality
[tempMString appendString:@"00500"]; // Preset4Fan
[tempMString appendString:@"00500"]; // Preset4Light
[tempMString appendString:@"00500"]; // Preset4Blind
[tempMString appendString:@"00010"]; // Preset4OccMode
[tempMString appendString:@"~"]; // Preset4ClosingMark
[tempMString appendString:@"00725"]; // Preset5Temperature
[tempMString appendString:@"00450"]; // Preset5Humidity
[tempMString appendString:@"08000"]; // Preset5AirQuality
[tempMString appendString:@"00800"]; // Preset5Fan
[tempMString appendString:@"00100"]; // Preset5Light
[tempMString appendString:@"00000"]; // Preset5Blind
[tempMString appendString:@"00010"]; // Preset5OccMode
// self.qrCodeString = [NSString stringWithString:tempMString];
```

The BSIS mobile application 322 may be further configured to encode additional data, such as user identification data unique to the computing device that generated the QR code to the BAS 100. Operation of the BSIS mobile application 322 will be explained in further detail below.

In addition to the instructions 322, the memory 320 of the mobile computing device 300 also includes data. The data may include records 324 of current and historical data related to operation of the mobile computing device 300. For example, the records 324 may include user identification information that identifies the mobile computing device 300. The records 324 may also include current and historical QR codes generated by the mobile computing device 300.

BSIS Mobile Application Operation

Figure 7:
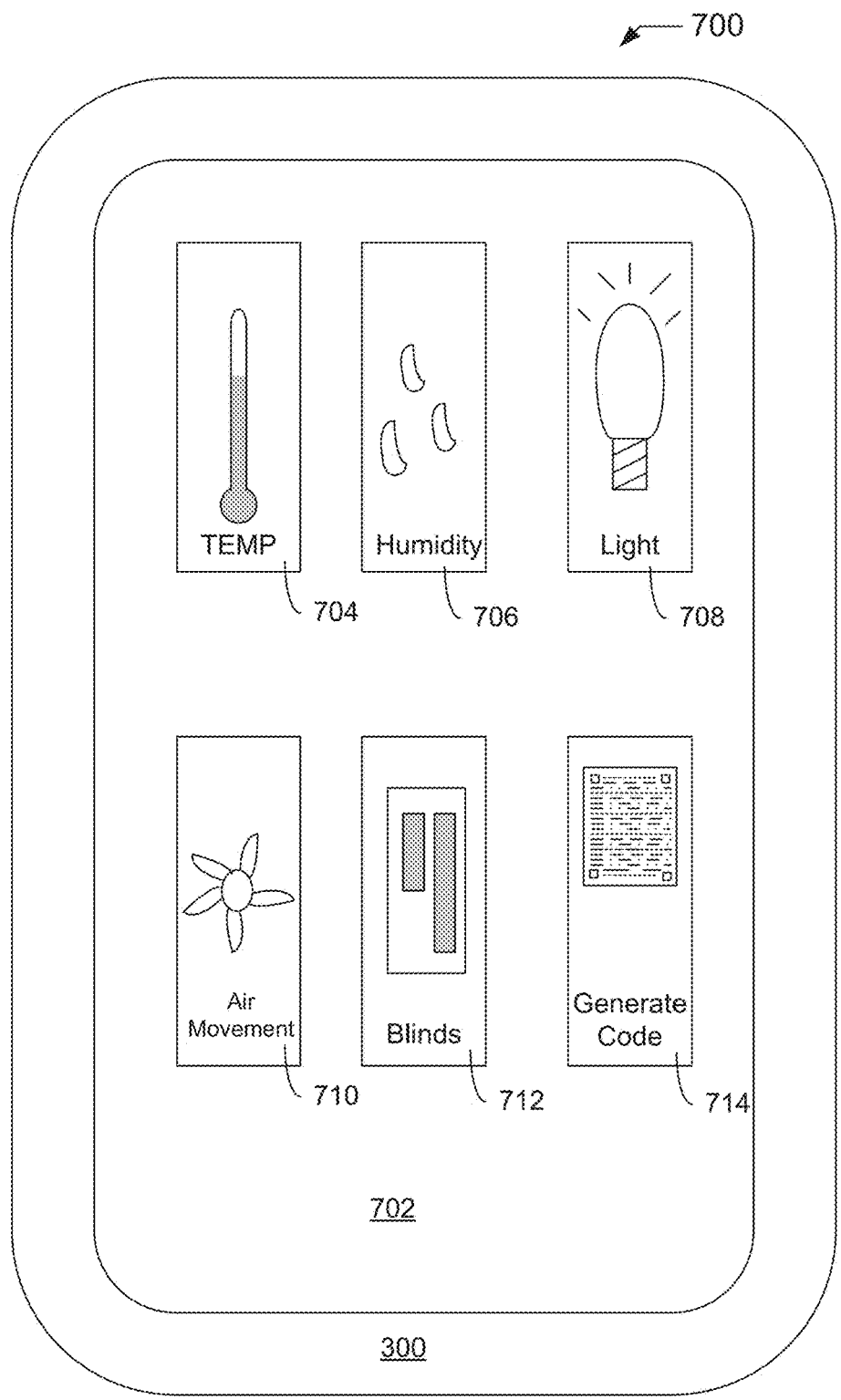
FIG. 7 illustrates a top level building synergistic interface system (BSIS) graphical user interface appearing on mobile computing device of FIG. 1.

With reference now to FIG. 7, a diagram of a graphical user interface 702 of the BSIS mobile application 700 that is generated by the execution of an application by the mobile device 300. The graphical user interface 702 may present a user with a plurality of environmental options 704, 706, 708, 710, 712 and QR code generator 714. In other implementations, additional or fewer options may be presented to a user. In yet other implementations, additional information may be provided for inclusion in the code (QR code in the current example) in addition to environmental options, such as clock-in, clock-out, security system activation, security system deactivation, location verification.

Figure 8:
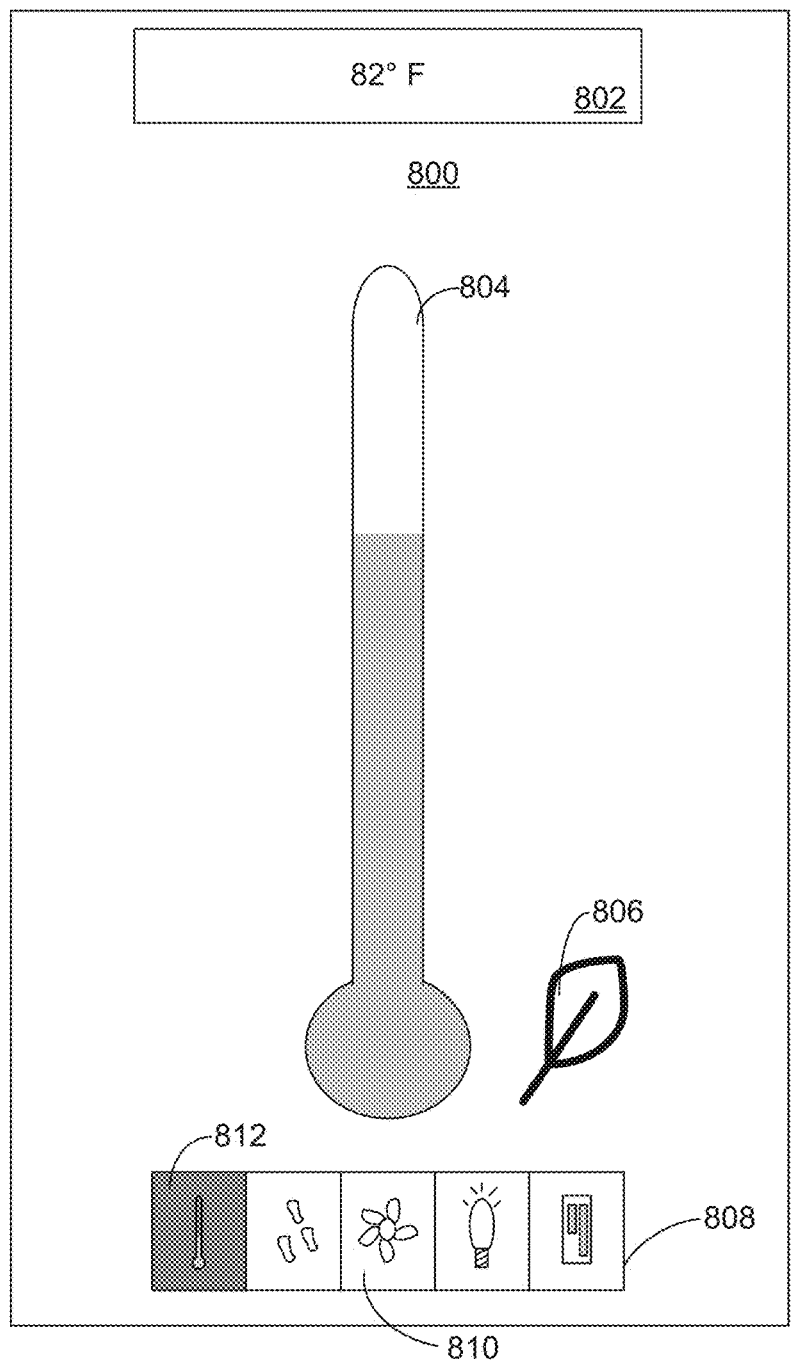
FIG. 8 illustrates a temperature control submenu graphical user interface that appears on the mobile computing device of FIG. 1.

If environmental option 704, for changing the temperature, is selected in the graphical user interface 702, a temperature graphical user interface 800, FIG. 8 is presented to the user. The desired temperature may be presented in numerical form 802. A graphical input may also be presented 804. The graphical input 804 is a slide bar in the shape of a thermometer. As the slide bar is moved, the desired temperature in numerical form 802 may also change in the current example. An additional conservation icon 806 may also be present. When the temperature is at an environmentally friendly level (60-68 degrees), the conservation icon 806 may appear green in color. As the temperature is raised, the green color of the conservation icon 806 gradually changes to red. The bottom of the graphical user interface 800 may provide a plurality of buttons 808 that correspond to the selections in the graphical user interface 702 display. The graphical user interface 800 may also have a temperature button 812 in the plurality of buttons 808 that visually indicates that it is the current selection. In the present example, the temperature button 812 is highlighted.

Figure 9:
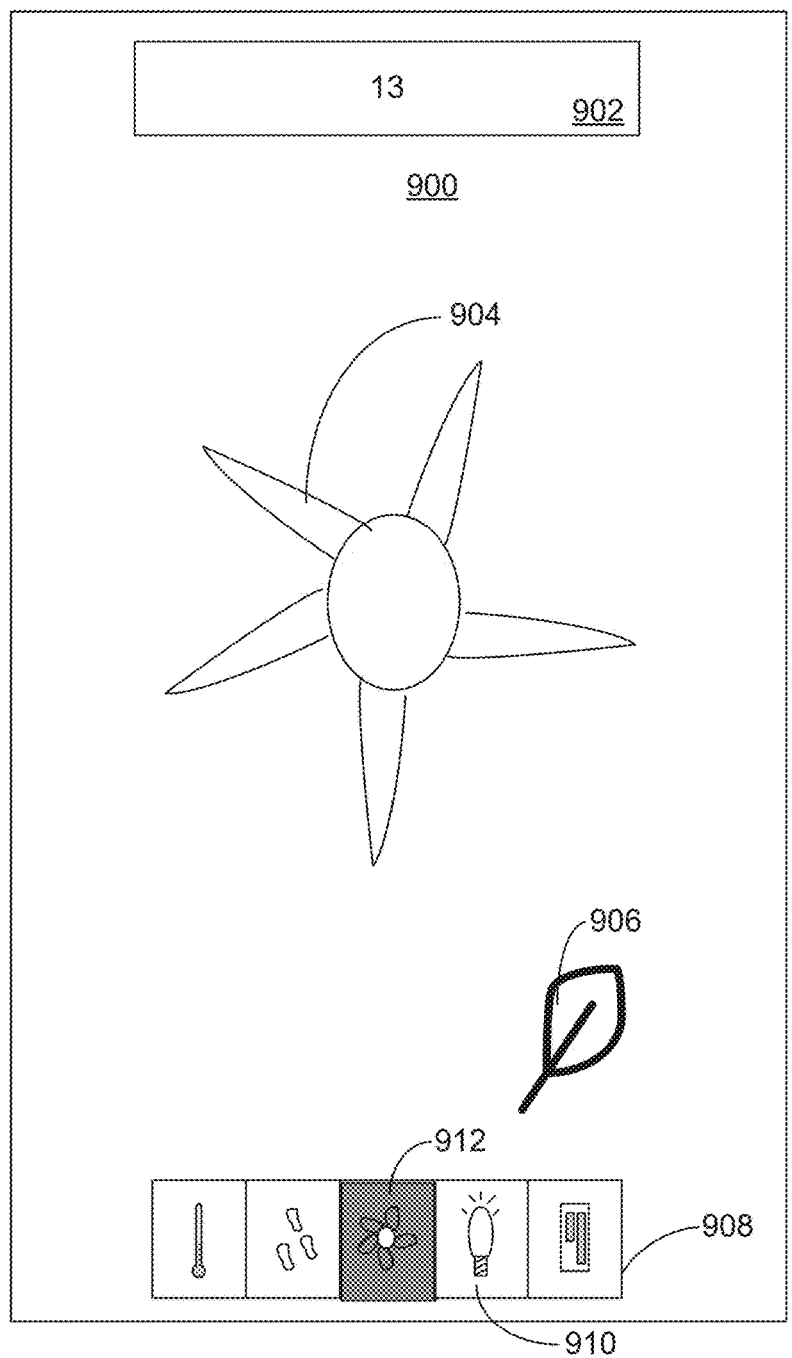
FIG. 9 illustrates a fan control submenu graphical user interface that appears on the mobile computing device of FIG. 1.

If fan control 710 or 810 is selected, a user is presented with a fan graphical user interface 900, FIG. 9. The desired speed of the fan is presented as a numerical value 902. A user is also presented with a virtual knob in the shape of a fan 904 that may be rotated in one direction to increase fan speed and in the other to reduce fan speed. The corresponding fan speed may be changed and displayed as a numerical value 902. The fan graphical user interface 900 may also have a conservation icon 906 that functions in a similar manner as 806, but with respect to fan speed. The graphical user interface 900 may also have a fan button 912 in the plurality of buttons 908 that visually indicates that it is the current selection. In the present example, the fan button 912 is highlighted.

Figure 10:
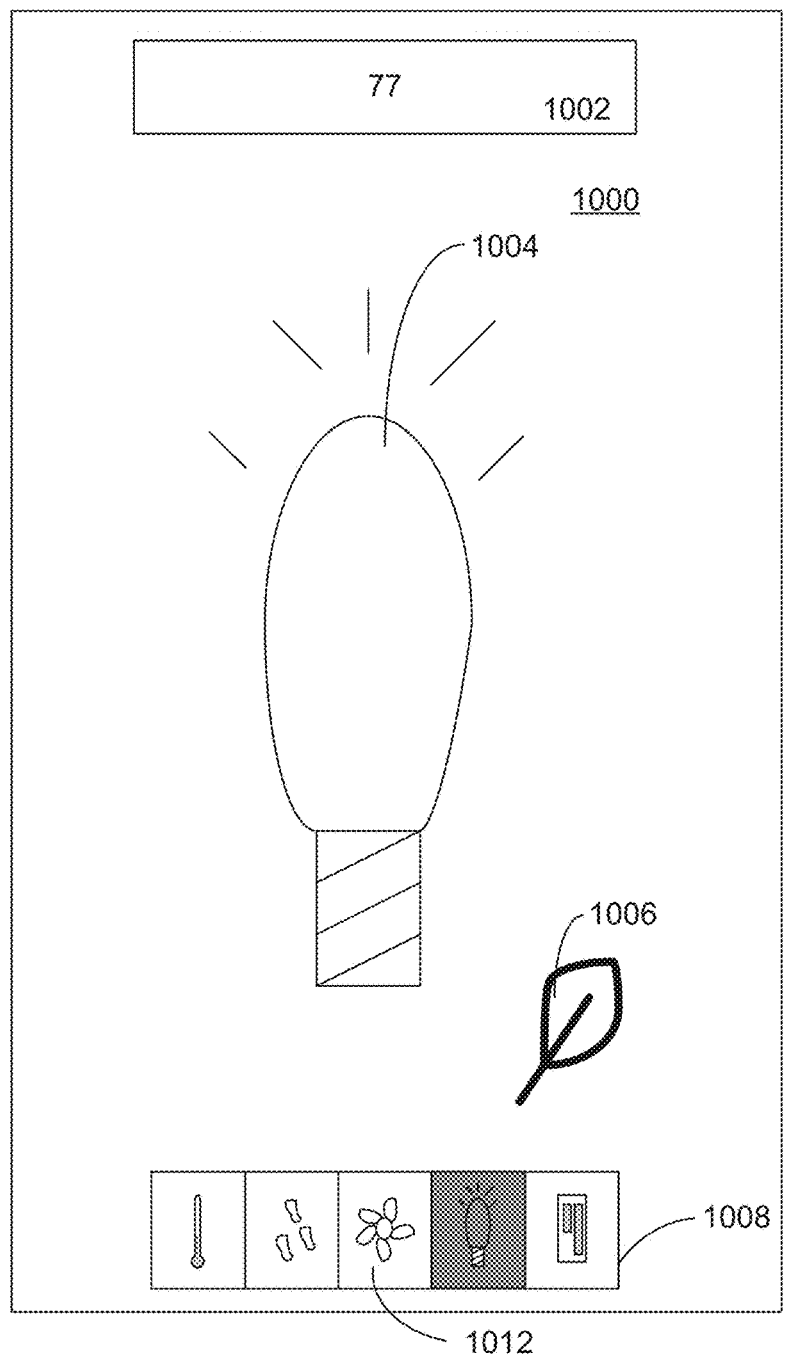
FIG. 10 illustrates a lighting control submenu graphical user interface that appears on the mobile computing device of FIG. 1.

If light control, such as 708 or 910, is selected, a user is presented with a light setting graphical user interface 1000, FIG. 10. The desired light setting is presented as a numerical value 1002. A user is also presented with an image of light bulb 1004 that a user moves a finger up or down on to change the light setting. The corresponding light setting may be changed and the updated value displayed as a numerical value 1002. The light setting graphical user interface 1000 may also have a conservation icon 1006 that functions in a similar manner as 806 and 906, but with respect to lighting. The graphical user interface 1000 may also have a fan button 1012 in the plurality of buttons 1008 that visually indicates that it is the current selection. In the present example, the light setting button 1012 is highlighted.

The humidity button 706 of FIG. 7 and blinds button 712 may operate in similar manners as the graphical user interfaces for temperature 800, fan speed 900, and light 1000.

BSIS Mobile App Process Flow

Figure 11A:
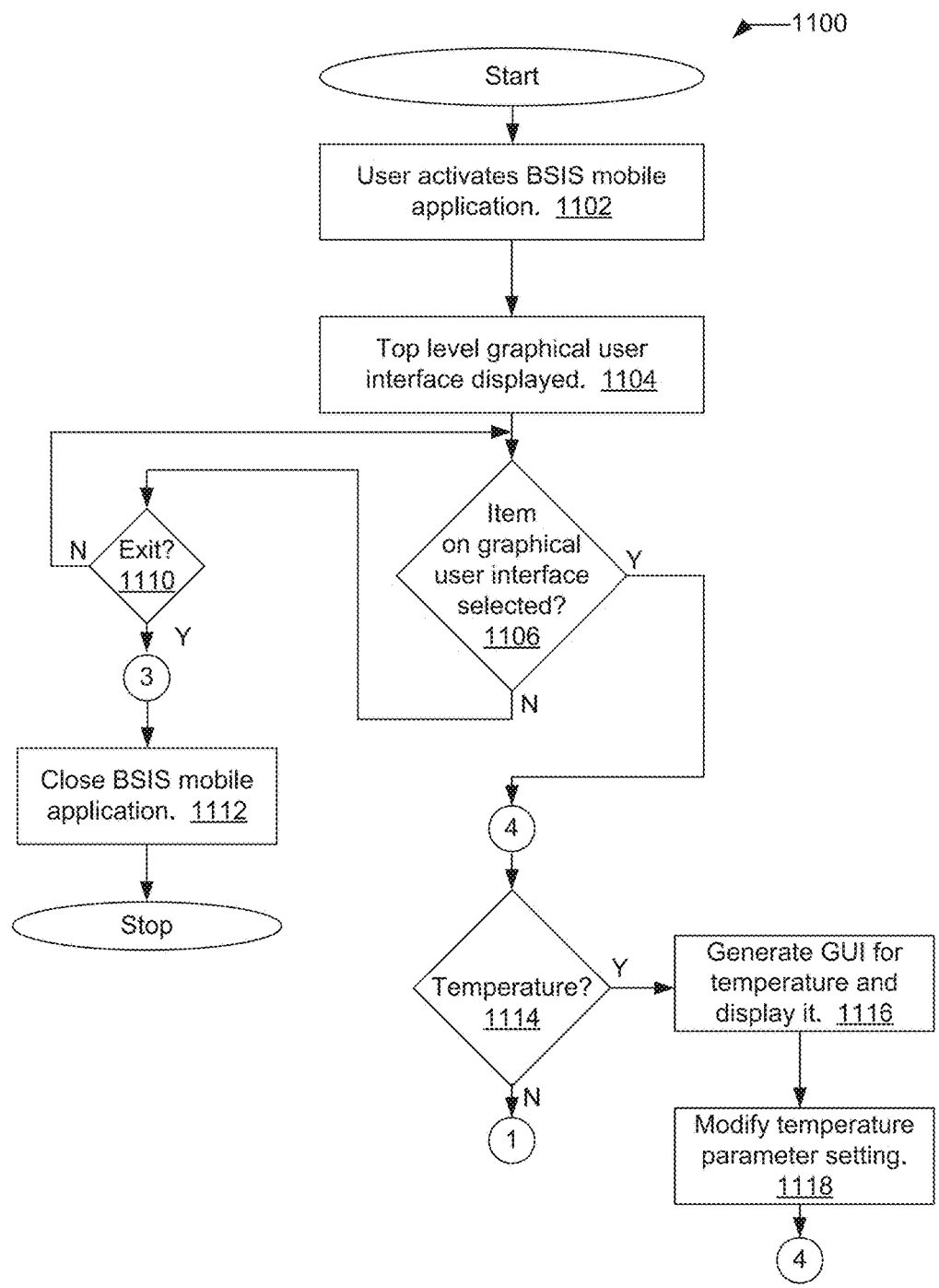
FIG. 11a illustrates a flow diagram of the process for the BSIS mobile application approach in accordance with an example implementation.
Figure 11B:
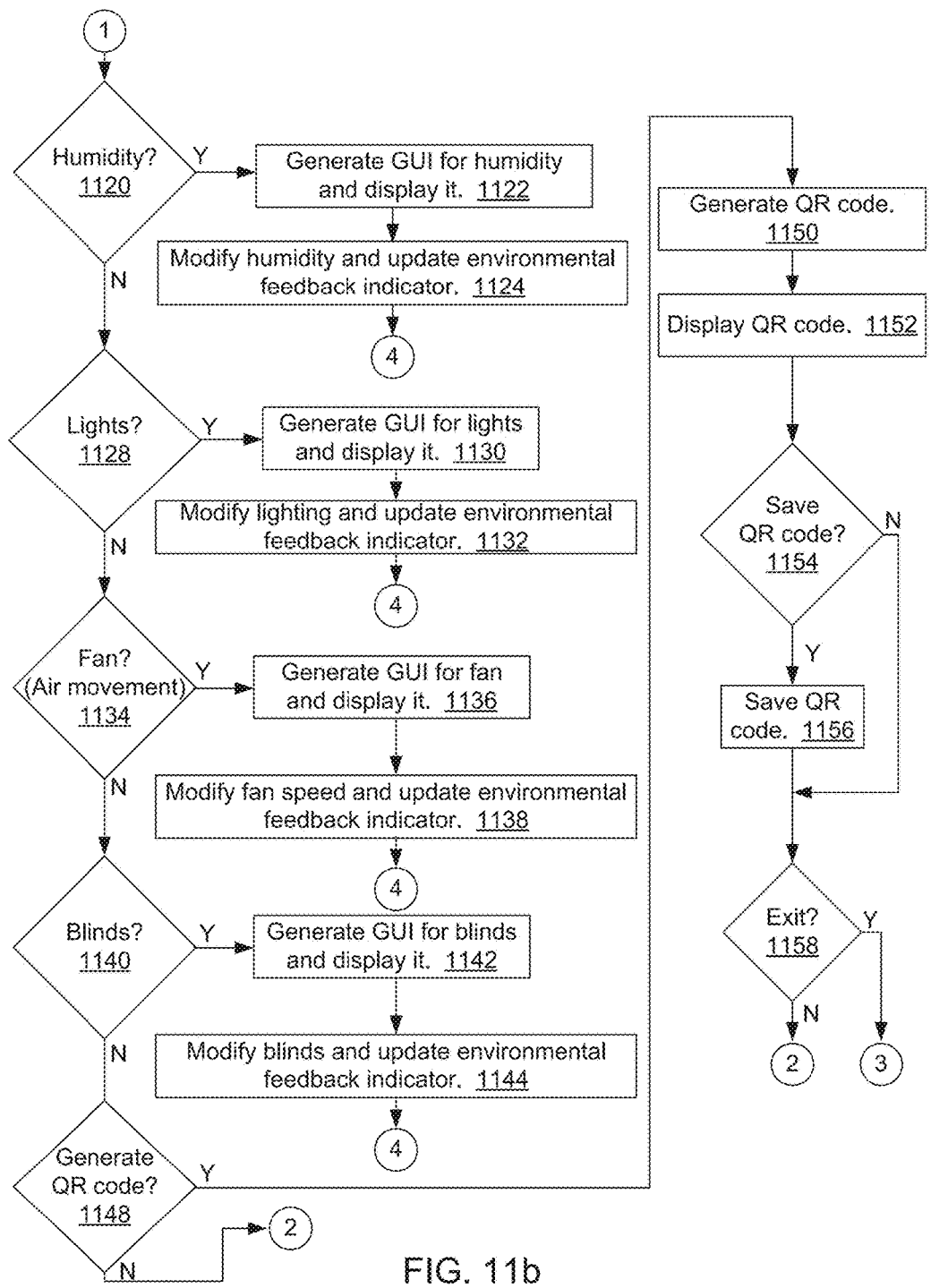
FIG. 11b continues to illustrate the flow diagram of the process for the BSIS mobile application approach in accordance with an example implementation.

Referring now to FIGS. 11a and 11b, an exemplary flow diagram 1100 of the BSIS mobile application 700 performed by the mobile device 300 is shown. The process begins with step 1102, where the user activates BSIS mobile application 702 that has been previously downloaded or otherwise installed on mobile device 300. In step 1104, the top level of the graphical user interface 702 of the BSIS mobile application 700 is displayed. The user is then able to select an environmental control submenu (704-714) from the top level of the graphical user interface 702 in step 1106. If no selection is made, the top level graphical user interface 702 continues to be displayed until it is exited in step 1110. If the application is exited in 1110, then it is closed and no longer displayed in step 1112.

If an environmental control submenu is selected in step 1106, then a check occurs in step 1114 for selection of the temperature graphical user interface 704. If the temperature graphical user interface has been selected in step 1114, the temperature graphical user interface submenu 800 is generated and displayed on mobile device 300 in step 1116. The user may then modify the temperature in step 1118. The user then may use the plurality of buttons 808 to select a different submenu or the mobile device's exit button to close the application.

If the humidity graphical user interface is selected in step 1106, then in step 1120 the humidity graphical user interface submenu is generated and displayed on mobile device 300 in step 1122. The user may then modify the humidity in step 1124. The user then may use the plurality of buttons 808 to select a different submenu or the mobile device's exit button to close the application.

If the light graphical user interface is selected in step 1106, then in step 1128 the light graphical user interface submenu 1000 is generated and displayed on mobile device 300 in step 1130. The user may then modify the light brightness in step 1132. The user then may use the plurality of buttons 1008 to select a different submenu or the mobile device's exit button to close the application.

If the fan graphical user interface is selected in step 1106, then in step 1134 the fan graphical user interface submenu 900 is generated and displayed on mobile device 300 in step 1136. The user may then modify the fan speed in step 1138. The user then may use the plurality of buttons 1008 to select a different submenu or the mobile device's exit button to close the application.

If the blinds graphical user interface is selected in step 1106, then in step 1140 the blinds graphical user interface submenu is generated and displayed on mobile device 300 in step 1142. The user may then change the blinds setting in step 1144. The user then may use the plurality of button to select a different submenu or the mobile device's exit button to close the application.

If the generate code graphical user interface is selected in step 1106, then in step 1148 the user is presented with a submenu graphical interface where he may confirm that the code (QR code in the current example) should be generated and generates the QR code in step 1150. The generated QR code may then be displayed in step 1152. The displayed QR code is displayed in step 1152, such that it may be read by a code reader that is in communication with the BAS 100. The user may also be given the option to save the QR code in step 1154. The QR code may be saved as a graphic or picture in the current implementation in step 1156. In other implementations, if text codes are employed, the text may be saved. When the user is finished generating the QR code, he or she may, in step 1158, exit the application or return to the top level BISI mobile application graphical user interface.

Exemplary BSIS Scenario

Figure 12:
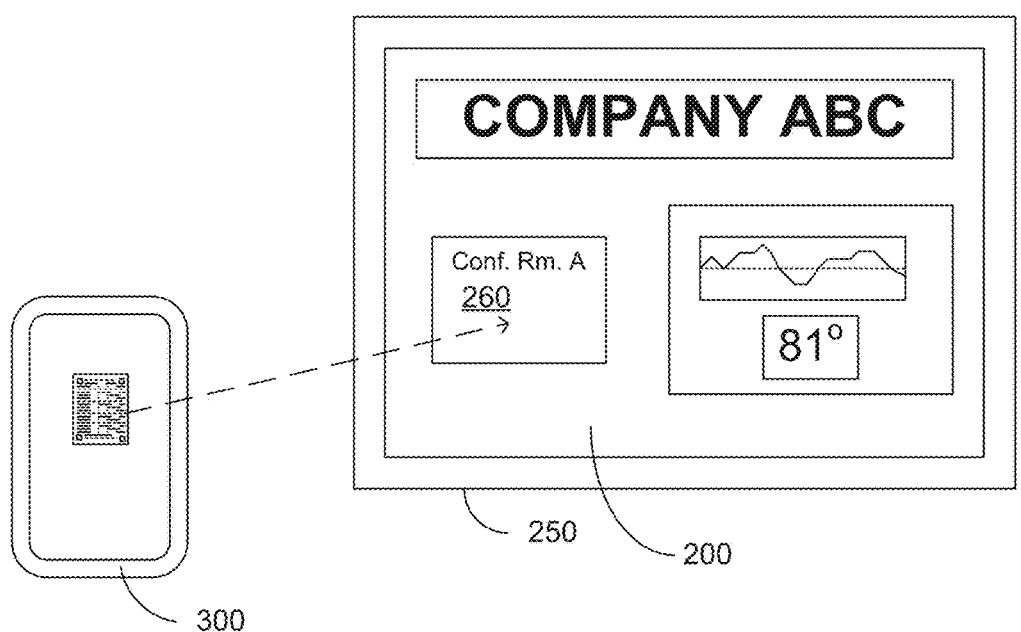
FIG. 12 shows an exemplary application of the mobile computing device with BSIS mobile application displaying a Quick Response (QR) code that is read by the environmental access panel.

With reference now to FIG. 12, exemplary interactions between the BSIS mobile application 322 and the BAS 100 are illustrated when a user scans a QR code with a mobile computing device 300. In this illustration, the user begins by using the mobile computing device 300 as described herein to set the desired environment using the BSIS mobile application graphical user interface 340. The user then generates a code (QR code in the current example) that is displayed upon the mobile computing device 300. The mobile computing device 300 is held up to BSIS 200 of the environmental access control panel 250. The BSIS 200 may be located in conference room "A." Then the QR code is read by the BSIS 200 in conference room "A", the BAS sets the environmental controls for conference room "A" to the settings encoded in the QR code. It is noted that there is no network connection between the mobile computing device and the BAS. The data is only passed via the BAS reading the QR code.

The BSIS mobile application may provide checks to verify that acceptable ranges for the environmental controls are being used, such as preventing the temperature from being set too low or too high. In other implementations, the checks may occur within the BAS.

In the current example, the reader's location was identified because the BAS knew where it was located. In other implementations, a user may use the BSIS graphical user interface and may set the location to be adjusted. The location to be adjusted may be entered as text in some implementations, or in other implementations, it may be set via pull down menus that have been preloaded.

The multiple codes may be individually saved in memory and recalled as needed. For example, a code for an office may be stored as "office," a code for conference room "A" may be stored as "Conf A," and so on. The code may also be printed out and affixed to a back of a badge, enabling the user to use the QR code without a mobile computing device.

Figure 13:
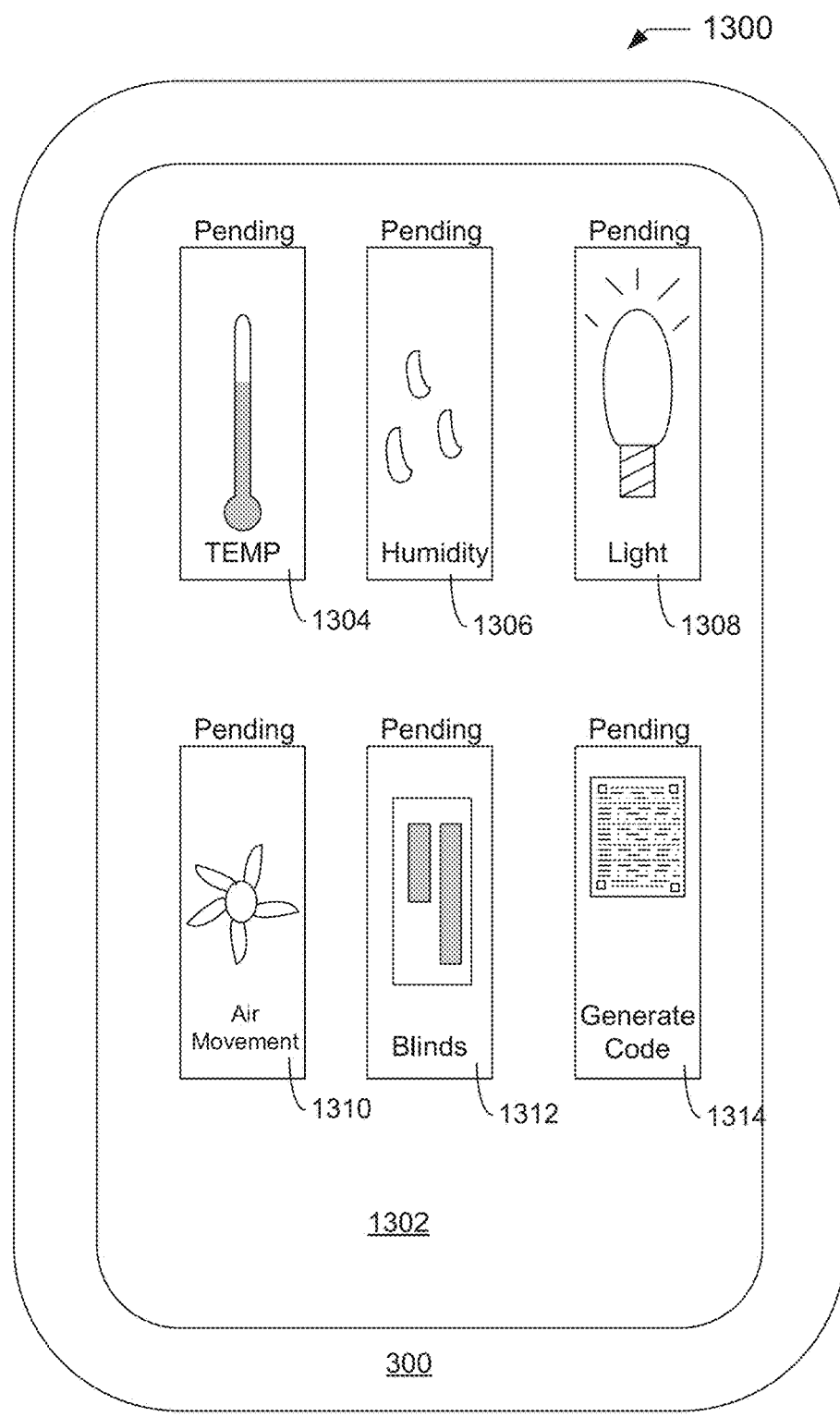
FIG. 13 illustrates a top level BSIS graphical user interface appearing on mobile computing device of FIG. 1 prior to configuration in accordance with an example implementation.

Turning FIG. 13, an illustration of a top level BSIS mobile application 1300 graphical user interface 1302 appearing on mobile computing device 300 of FIG. 1 prior to configuration in accordance with an example implementation is shown. The graphical user interface 1302 starts and shows the different environmental controls 1304-1314 that may be controlled. Each of the environmental controls 1304-1314 has an indication of "Pending" because the underlying application has not been configured or populated with data associated with the BAS. The graphical user interface may place the BSIS mobile application 1300 into a configuration mode or operation mode. In the current example, a user would tap the graphical user interface 1302 and be placed into the configuration mode since all of the environmental controls are "Pending."

Figure 14:
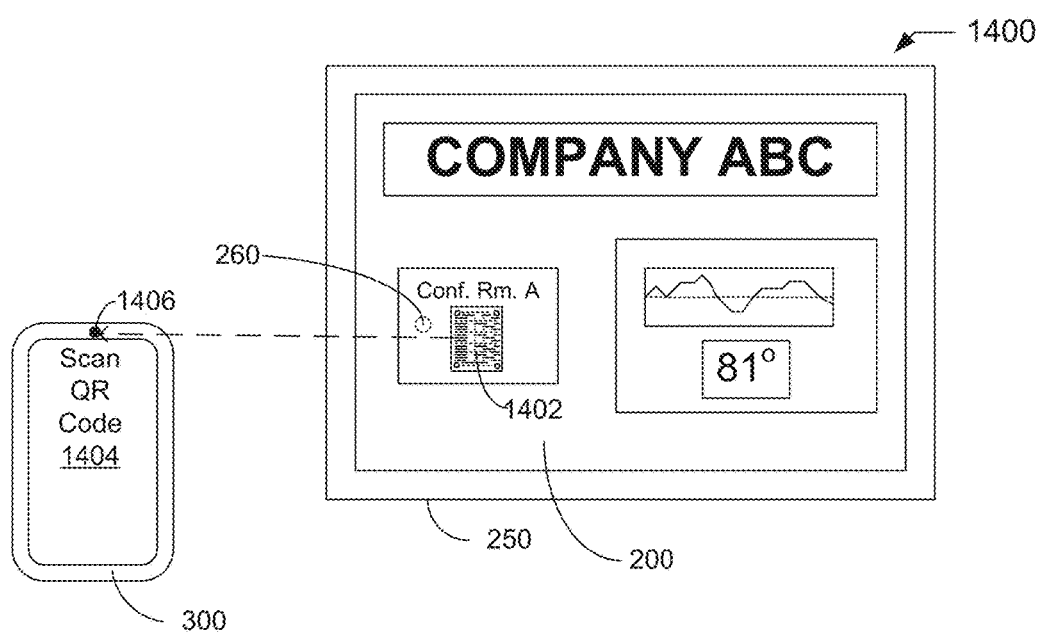
FIG. 14 shows an exemplary application of the mobile computing device with BSIS mobile application read a QR code that is displayed by the environmental access panel in accordance with an example implementation.

In FIG. 14, an exemplary illustration 1400 of the mobile computing device 300 executing the BSIS mobile application 1300 reading a QR code 1402 that is displayed by the environmental access panel 250 in accordance with an example implementation is depicted. The BSIS mobile application on mobile device 300 displays a "Scan QR Code" message" 1404 that tells the user that BSIS mobile application 322 is in the configuration mode. The mobile device 300 reads or scans the QR code 1402 that is encoded with configuration and authentication data via scanner/camera 1406. BSIS mobile application decodes the QR code 1402 and configures the application with the configuration data and authentication data. The BSIS mobile application then is changed to operation mode and the display of FIG. 7 is presented to the user of mobile device 300.

The configuration data is data associated with the different parts of the BAS. Data may include a subset of HVAC system control points, lights, blinds, security systems, and other BAS that may be local or associated with the user. The authentication data may be data that associates the user, mobile device and BAS. The user may be given a password that must be entered into the BSIS mobile application prior to use of the application or generation of a code. The authentication data in the QR code may also contain a unique identifier for the BSIS mobile application, such that every code (QR code) that is generated by the mobile computing device 300 has that code. In other implementations, public encryption keys may be in the authentication data encoded into the QR code 1402 that when used with a private key, enables encrypted data to pass between the mobile computing device 300 and the BAS. In yet other implementation, configuration data for use by other applications may be passed in the code, such as network addressing, wireless keys, email certificates, etc. . . . . .

Figure 15:
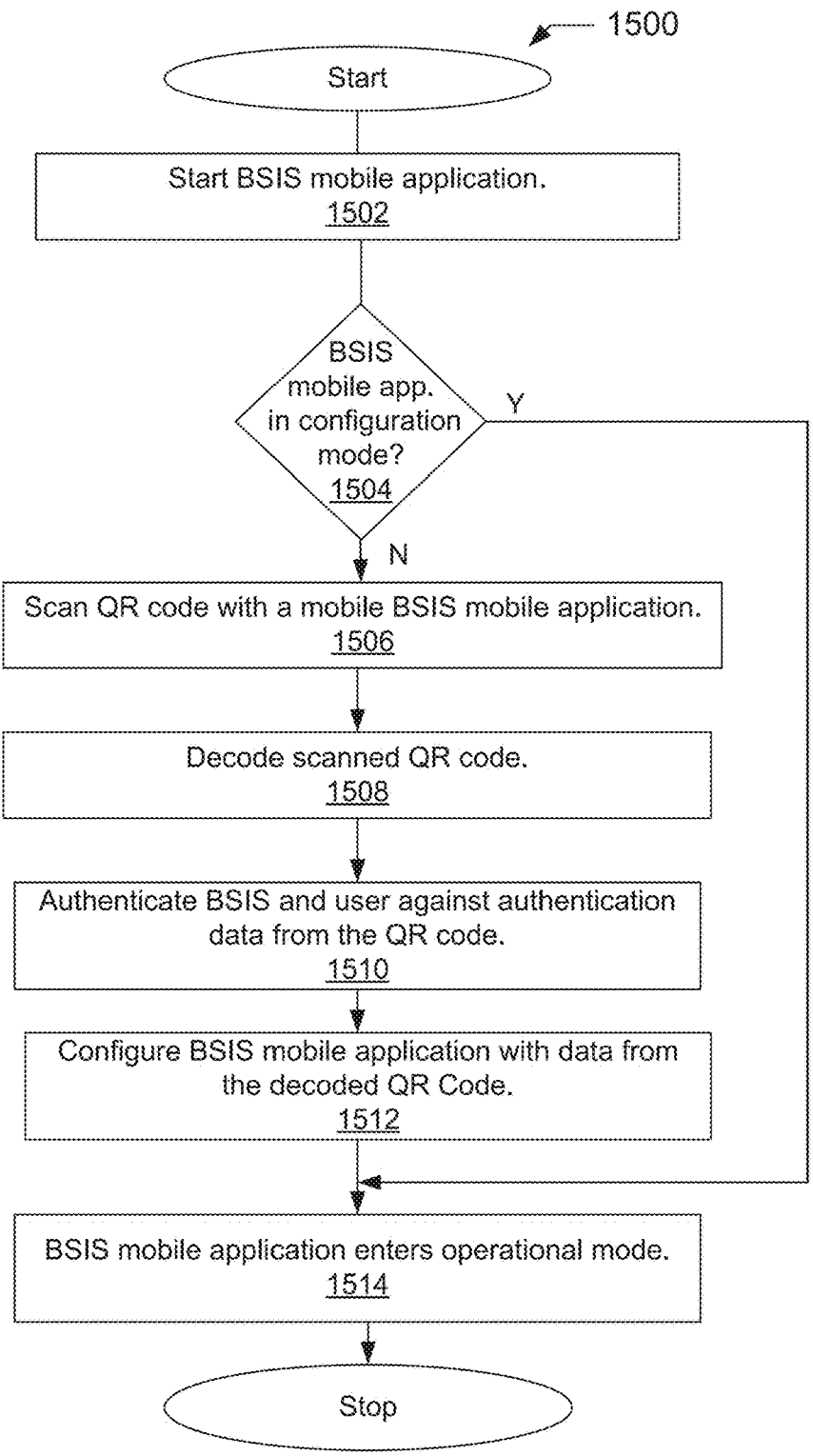
FIG. 15 depicts a flow diagram of a BSIS being configured by reading a QR code.

Turning to FIG. 15, a flow diagram 1500 of a BSIS mobile application being configured by reading a QR code is depicted. The BSIS mobile application 1300 is started in step 1502. The BSIS mobile application 1300 checks for configuration data and a determination is made if BSIS is to be in configuration mode in step 1504. If configuration data is present in step 1504, then in step 1514, the BSIS mobile application enters the operational mode.

If the BSIS mobile application 1300 is in the configuration mode in step 1504, then the BSIS mobile application, with graphical interface displaying the "scan QR code" message 1404 the BSIS mobile application scans a QR code in step 1506 using scanner/camera 1406. The BSIS mobile application 1300 then decodes the scanned QR code in step 1508. The decoded data may have authentication data that is compared to authentication contained in the BSIS mobile application and the user may also be authenticated in step 1510. Examples of this type of authentication may include verifying that BSIS application is licensed for use with the BAS that generated the QR code and a user password may be required to validate the user of the BSIS mobile application. The BSIS mobile application 1300 is configured with BAS configuration data. The operational mode is entered in step 1514 and a graphical display such as in FIG. 7 is presented to the user of the BSIS mobile application.

In other implementations, a graphical user interface may be provided to enable the updating of configuration and authentication data. Such updates would require a configuration mode to be entered and a QR code to be read. As part of authentication, the date of code generation may be verified. Using such updates, users could quickly and easily have their application authentication and configuration rapidly and securely updated. In yet other implementations, the QR data for configuration and authentication may be printed out on paper or sent in an email for use by a user. This enables new employees and guests to have their codes generated and available prior to arriving.

In the current implementations, the mobile computing device executes the BSIS mobile application. In other implementations, a desktop computer may be used to execute an application. The application may implement the process of FIG. 11a and FIG. 11b and be executed by a computer's processor that is running an operating system, such as Windows or Linux. In yet other implementations, the application may implement the process of FIGS. 11a, 11b and 15 in a "browser" such as Internet Explorer, Chrome, Safari, and Firefox by a processor on a computerized device.

While the BSIS application is described as being implemented as software executed by a device with a processor (i.e., as a combination of hardware and software), the embodiments presented may be implemented in hardware alone such as in an application-specific integrated circuit ("ASIC") device.

The foregoing detailed description of one or more embodiments of the Building Synergistic Interface System for a Building Automation System has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A field panel for controlling a building automation system, comprising:
 a processor;
 an input device of the building automation system, coupled to the processor, able to read a code received from a mobile device,
 wherein the input device is a scanner/camera; and
 wherein the processor decodes the code into data associated with building automation and
 at least a first portion of the data is used to configure an application executed by the processor,
 wherein the first portion of the data comprises authentication data; and
 a communication module coupled to the processor, wherein the communication module transmits at least a second portion of the data associated with the building automation system to at least one environment system that makes up the building automation system,
 wherein the second portion of the data comprises configuration data.

2. The field panel for controlling a building automation system of claim 1, wherein the code is a Quick Response code.

3. The field panel for controlling a building automation system of claim 1, wherein the data includes authentication data associated with the user.

4. The field panel for controlling a building automation system of claim 1, wherein the data includes authentication data associated with authentication of the application.

5. The field panel for controlling a building automation system of claim 1, wherein the at least the second portion of the data includes at least one building automation parameter selected from the group consisting of temperatures, light, or air movement.

6. A method for configuration of a building automation system, comprising:
 reading a code with an input device of the building automation system, wherein the code is received from a mobile device, and
 wherein the input device is a scanner/camera;
 decoding the code into data associated with building automation with a processor of the building automation system;
 configuring an application of the building automation system executed by the processor with at least a first portion of the data,
 wherein the first data includes authentication data; and
 transmitting at least a second portion of the data associated with the building automation system to at least one environment system that makes up the building automation system,
 wherein the second data includes configuration data.

7. The method for configuration of a building automation system of claim 6, further comprising a configuration mode that the application is in when reading the code.

8. The method for configuration of a building automation system of claim 7, further comprising an operational mode that the application is in after configuring the application.

9. The method for configuration of a building automation system of claim 6, wherein the code is a Quick Response code.

10. The method for configuration of a building automation system of claim 6, comprising authenticating the user with authentication data of the data.

11. The method for configuration of a building automation system of claim 6, comprising authenticating the application with decoded authentication data.

12. The method for configuring of a building automation system of claim 6, wherein the at least the second portion of the data includes at least one building automation parameter selected from the group consisting of temperatures, light, or air movement.

13. A non-transitory computer-readable medium with a plurality of instructions for implementing a method for configuration of a building automation system, comprising instructions for:
   reading a code with a camera/scanner input device of the building automation system, wherein the code is received from a mobile device;
   decoding the code into data associated with building automation with a processor of the building automation system;
   configuring an application of the building automation system with at least a first portion of the data, wherein the first data includes authentication data; and
   transmitting at least a second portion of the data associated with the building automation system to at least one environment system that makes up the building automation system,
   wherein the second data includes configuration data.

14. The non-transitory computer-readable medium with a plurality of instructions for implementing a method for configuration of a building automation system of claim 13, further comprising instructions for a configuration mode that the application is in when reading the code.

15. The non-transitory computer-readable medium with a plurality of instructions for implementing a method for configuration of a building automation system of claim 14, wherein the instructions further include an operational mode that the application is in after configuring the application.

16. The non-transitory computer-readable medium with a plurality of instructions for implementing a method for configuration of a building automation system of claim 13, wherein the code is a Quick Response code.

17. The non-transitory computer-readable medium with a plurality of instructions for implementing a method for configuration of a building automation system of claim 13, wherein the at least the second portion of the data includes at least one building automation parameter selected from the group consisting of temperatures, light, or air movement.

* * * * *